(12) United States Patent
Nagai et al.

(10) Patent No.: US 11,247,478 B2
(45) Date of Patent: Feb. 15, 2022

(54) LIQUID STORAGE BOTTLE AND METHOD FOR MANUFACTURING THE SAME

(71) Applicant: CANON KABUSHIKI KAISHA, Tokyo (JP)

(72) Inventors: Noriyasu Nagai, Tokyo (JP); Kenta Udagawa, Tokyo (JP); Hiroki Hayashi, Kawasaki (JP); Hiroshi Koshikawa, Yokohama (JP); Manabu Ohara, Kawasaki (JP); Shoki Takiguchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/827,408

(22) Filed: Mar. 23, 2020

(65) Prior Publication Data

US 2020/0307230 A1 Oct. 1, 2020

(30) Foreign Application Priority Data

Mar. 29, 2019 (JP) .............................. JP2019-069100

(51) Int. Cl.
*B41J 2/175* (2006.01)

(52) U.S. Cl.
CPC ................................ *B41J 2/17523* (2013.01)

(58) Field of Classification Search
CPC .... B41J 2/1752; B41J 2/17523; B41J 2/1754; B41J 2/17553; B41J 29/02; B41J 29/13; B29C 65/0672; B29C 66/1222; B29C 66/1224; B29C 66/12841; B29C 66/522; B29C 66/542

See application file for complete search history.

(56) References Cited

U.S. PATENT DOCUMENTS

| | | | | |
|---|---|---|---|---|
| 5,122,272 A * | 6/1992 | Lana | ........................ | A45F 3/16 210/244 |
| 5,681,463 A * | 10/1997 | Shimizu | ................. | B01D 61/18 210/266 |
| 6,712,232 B2 * | 3/2004 | Tanaka | .............. | B29C 45/14598 215/379 |
| 7,434,702 B2 * | 10/2008 | Yaita | ................... | B29C 45/0062 215/274 |
| 9,010,912 B2 * | 4/2015 | Ichimura | .............. | B41J 2/16505 347/85 |

FOREIGN PATENT DOCUMENTS

JP 2004-209901 A 7/2004

* cited by examiner

*Primary Examiner* — Anh T Vo
(74) *Attorney, Agent, or Firm* — Canon U.S.A., Inc. I.P. Division

(57) ABSTRACT

A liquid storage bottle includes a bottle main body having a first cylindrical portion formed of a resin and a nozzle and has a second cylindrical portion formed of a resin and welded to the first cylindrical portion on an outer peripheral side of the first cylindrical portion. The first cylindrical portion includes an outer peripheral surface and a first annular surface extending radially outward from an axial end portion of the outer peripheral surface, the second cylindrical portion includes an inner peripheral surface facing the outer peripheral surface of the first cylindrical portion and a second annular surface which extends radially outward from an axial end portion of the inner peripheral surface and faces the first annular surface of the first cylindrical portion, and a peripheral wall portion extending in an axial direction is formed radially outside the second annular surfaces.

18 Claims, 12 Drawing Sheets

Figure 1:
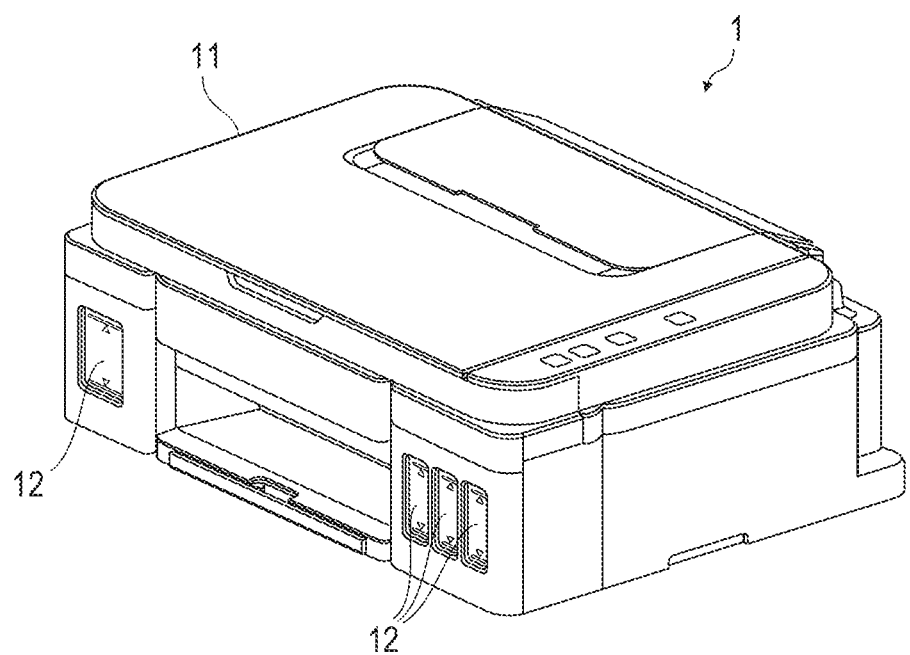
Figure 2:
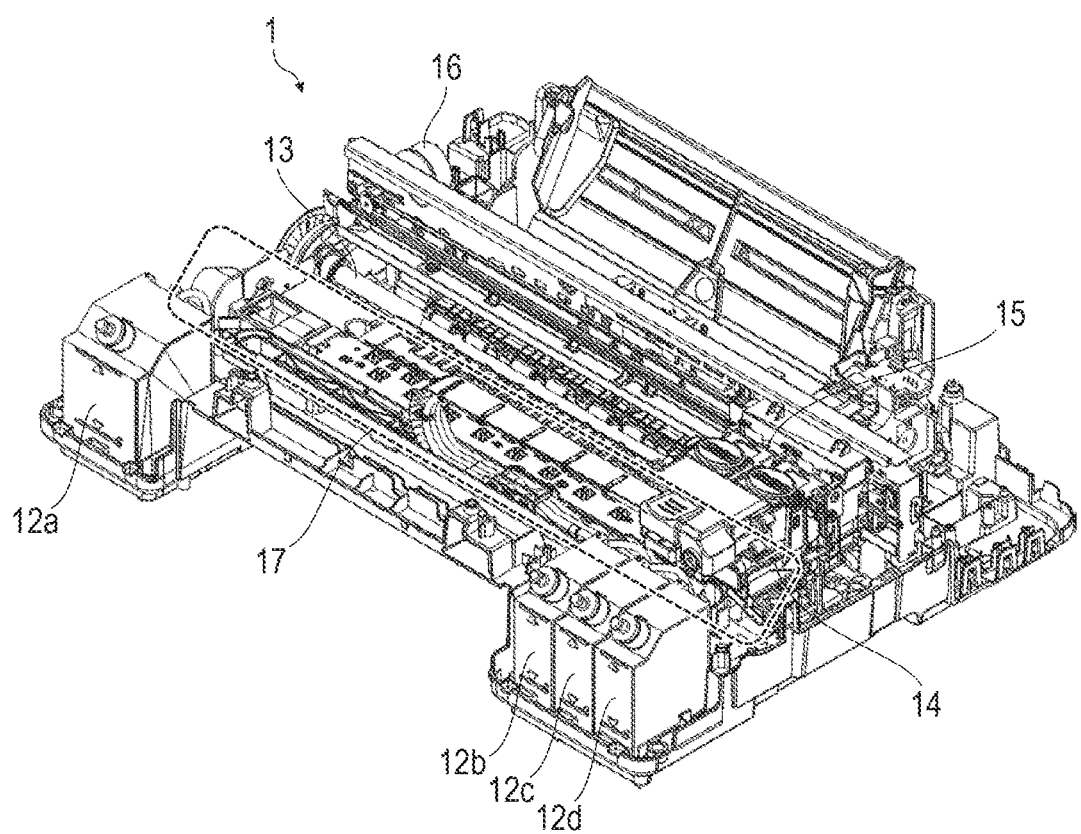

The liquid ejection device 1 includes a transport roller 13 which transports the recording medium (not illustrated), a carriage 15 in which a recording head 14 for ejecting a liquid is provided, and a carriage motor 16 which drives the carriage 15. For example, the recording medium is paper. However, the recording medium is not particularly limited as long as an image is formed by the liquid ejected from the recording head 14. The transport roller 13 is intermittently driven rotationally, and thus, the recording medium is intermittently transported. As the carriage motor 16 is rotationally driven, the carriage 15 reciprocates in a direction intersecting a transport direction of the recording medium, and the liquid is ejected to the recording medium from an ejection port provided in the recording head 14 during reciprocating scanning of the carriage 15. Accordingly, the image is recorded on the recording medium.

The liquid is stored in the liquid tank 12 and is supplied to the recording head 14 through a liquid flow path 17. As the liquid, ink of four colors (for example, cyan, magenta, yellow and black) is used, and as the liquid tank 12, four liquid tanks 12a to 12d each storing the ink of each color are provided. Each of the four liquid tanks 12a to 12d is disposed in a front surface portion of the liquid ejection device 1 inside the housing 11.

Figure 3:
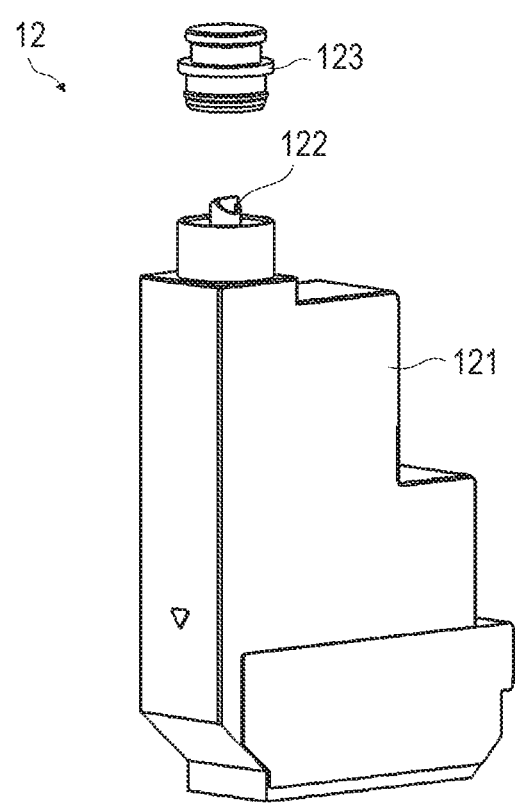

FIG. 3 is a perspective view of the liquid tank of the liquid ejection device illustrated in FIG. 1.

The liquid tank 12 includes a tank main body 121 which stores the liquid, an inlet 122 which communicates with a liquid storage chamber in the tank main body 121, and a tank cover 123 which can be mounted on the tank main body 121 so as to cover the inlet 122. The liquid tank 12 is replenished with the liquid through the inlet 122 which is exposed by removing the tank cover 123 from the tank main body 121. After the liquid is replenished, the tank cover 123 is attached to the tank main body 121 in order to suppress evaporation of the ink from the liquid storage chamber in the tank main body 121, and thus, the liquid storage chamber in the tank main body 121 is sealed.

First Example Embodiment

Figure 4:
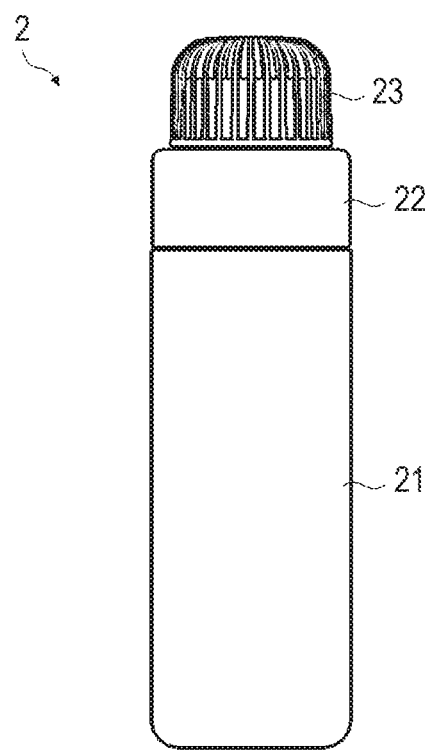
Figure 5:
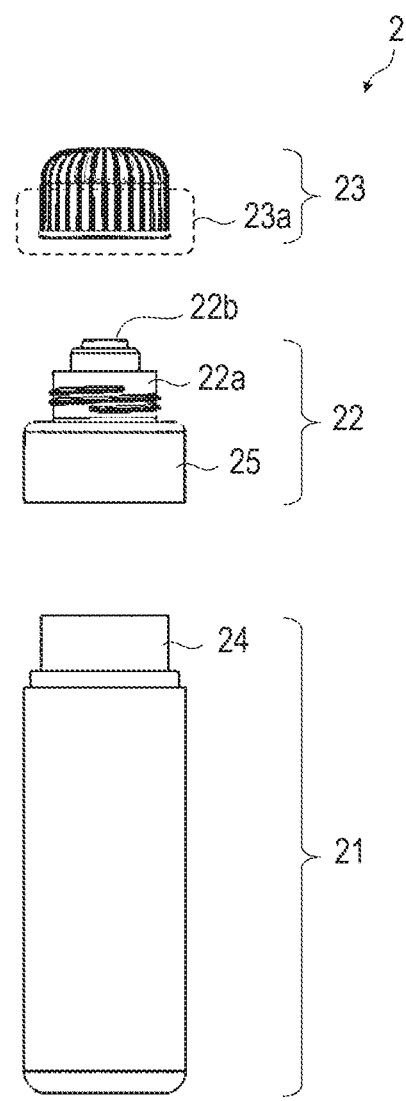

FIG. 4 is a side view of a liquid storage bottle according to a first embodiment of the present disclosure. FIG. 5 is an exploded side view of the liquid storage bottle illustrated in FIG. 4.

The liquid storage bottle 2 is a cylindrical container for replenishing the liquid tank 12 with the liquid, and includes a bottle main body 21 which stores the liquid, a nozzle 22 and a cap 23. The nozzle 22 is fixed to the bottle main body 21 and has a function of injecting the liquid stored in the bottle main body 21. The cap 23 can be mounted on the nozzle 22 so as to open and close an inlet 22b described later of the nozzle 22, and has a function of shielding an inside of the bottle main body 21 from an outside air and sealing the liquid storage bottle 2. Both the bottle main body 21 and the nozzle 22 are products made of a resin and are joined to each other by welding so as to prevent the liquid from leaking from a gap therebetween.

A cylindrical bottle welding portion 24 is formed in an upper portion of the bottle main body 21, and a cylindrical nozzle welding portion 25 is formed in a lower portion of the nozzle 22. One of an inner peripheral surface and a bottom surface of the nozzle welding portion 25 is welded to the bottle welding portion 24, and thus, the nozzle 22 is joined to the bottle main body 21. In the present embodiment, spin welding is used for this joining. A nozzle screw portion 22a having a male screw formed on an outer peripheral surface is formed at a center portion of the nozzle 22, and a cap screw portion 23a having a female screw formed on an inner peripheral surface is formed in a lower portion of the cap 23. The male screw of the nozzle screw portion 22a is screwed to the female screw of the cap screw portion 23a, and thus, the cap 23 is mounted on the nozzle 22. The inlet 22b through which the liquid is injected is formed in the nozzle 22.

Figure 6:
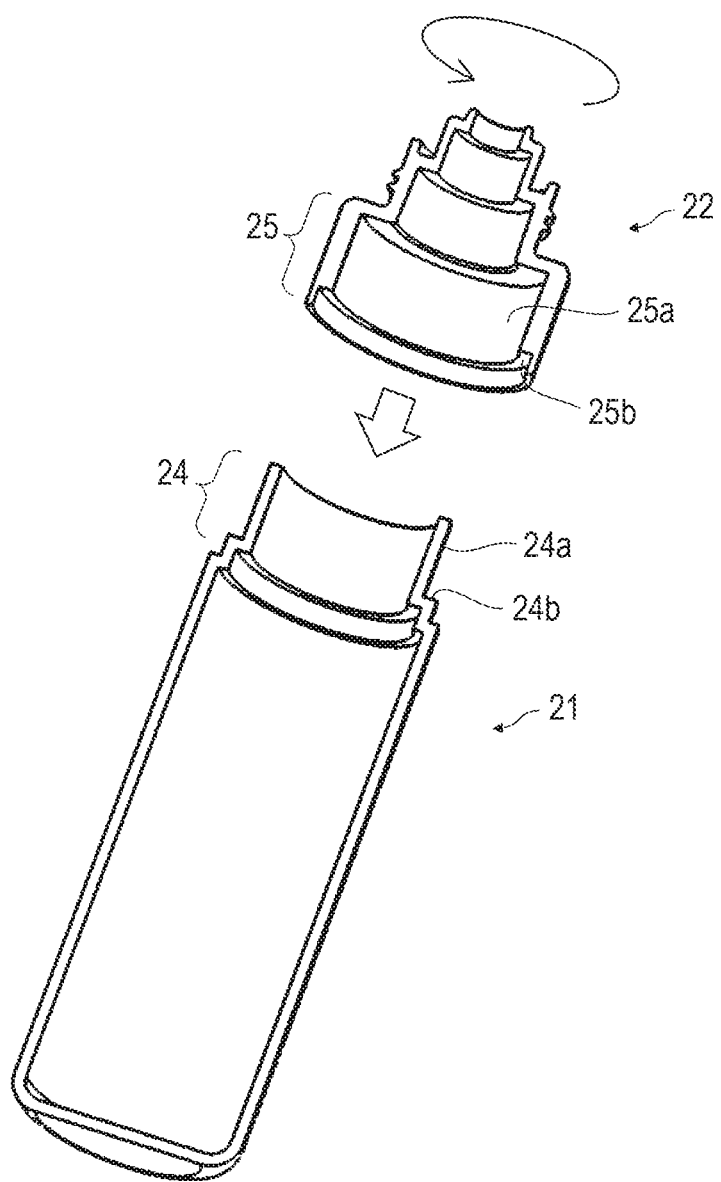

FIG. 6 is an exploded perspective view illustrating a state where the bottle main body and the nozzle are spin-welded to each other in the present embodiment.

The joining of the bottle main body 21 and the nozzle 22 by the spin welding is performed as follows. First, the bottle welding portion 24 (first cylindrical portion) and the nozzle welding portion (second cylindrical portion) 25 having the following shapes are prepared in the bottle main body 21 and the nozzle 22, respectively. That is, an outer peripheral surface 24a and a first annular surface 24b which extends radially outward from an axial end portion of the outer peripheral surface 24a are formed in the bottle welding portion 24 (first cylindrical portion). An inner peripheral surface 25a and a second annular surface 25b which extends radially outward from an axial end portion of the inner peripheral surface 25a are formed in the nozzle welding portion (second cylindrical portion) 25. Moreover, the bottle welding portion 24 is inserted into the nozzle welding portion 25 such that the outer peripheral surface 24a of the bottle welding portion 24 and the inner peripheral surface 25a of the nozzle welding portion 25 face each other, and the first annular surface 24b of the bottle welding portion 24 and the second annular surface 25b of the nozzle welding portion 25 come into contact with each other. If the bottle main body 21 and the nozzle 22 are rotated relative to each other in this state, frictional heat is generated between the first annular surface 24b and the second annular surface 25b, and the resin is melted using the frictional heat. Accordingly, the bottle main body 21 and the nozzle 22 are joined to each other by welding. In this way, manufacturing of the liquid storage bottle 2 in which the nozzle welding portion (second cylindrical portion) 25 is welded to the bottle welding portion 24 on an outer peripheral side of the bottle welding portion 24 (first cylindrical portion) is completed.

Figure 7A:
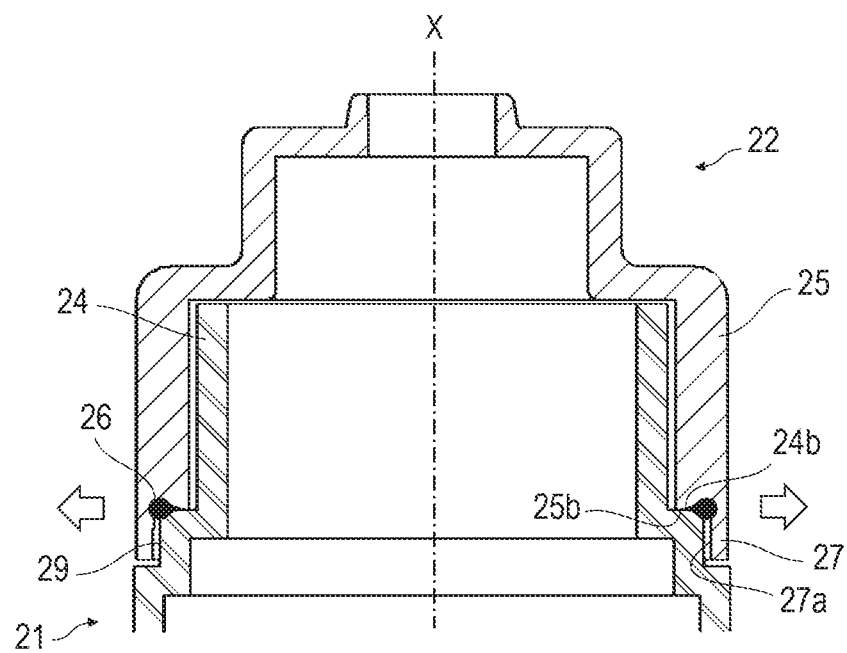
Figure 7B:
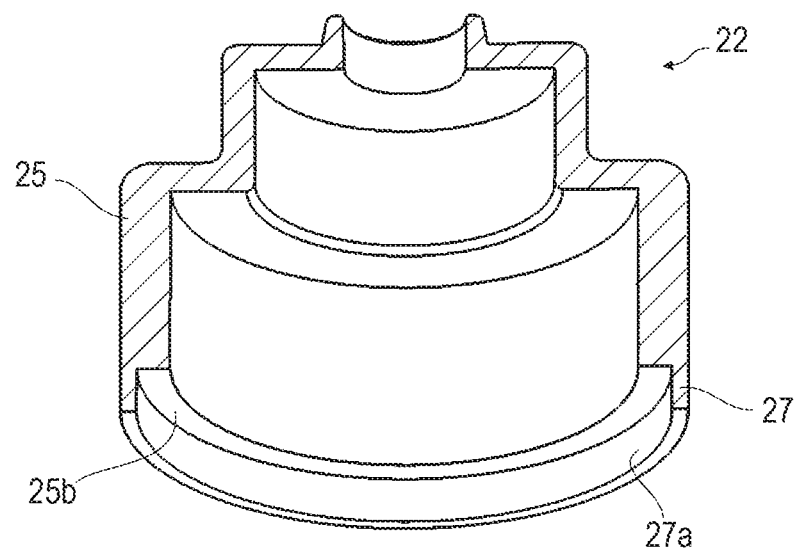

FIG. 7A is a cross-sectional view of the bottle main body and the nozzle of the present embodiment, and FIG. 7B is a perspective view illustrating a cross section of the nozzle of the present embodiment.

If the bottle welding portion 24 is inserted into the nozzle welding portion 25 and rotated relative to each other, as described above, the frictional heat is generated between the first annular surface 24b of the bottle welding portion 24 and the second annular surface 25b of the nozzle welding portion 25, and the resin is melted by the frictional heat. A melted resin 26 generated in this case receives a centrifugal force generated by the relative rotation between the bottle welding portion 24 and the nozzle welding portion 25 and moves radially outward between the first annular surface 24b and the second annular surface 25b (refer to arrows in FIG. 7A). If the melted resin 26 protrudes to an outside of the liquid storage bottle 2, there is a possibility that an appearance of a product may be reduced or a function of the product may be reduced by being caught by a user's hand. Further, if the melted resin 26 is scattered from the liquid storage bottle 2, the melted resin 26 remains as garbage on a production line, which may cause a device failure.

Therefore, in the present embodiment, a peripheral wall portion 27 protruding in an axial direction X of the nozzle 22 is formed radially outside the second annular surface 25b.

Accordingly, even if the melted resin 26 moves radially outward through a space between the first annular surface 24b and the second annular surface 25b, the melted resin 26 reaches the peripheral wall portion 27 and is attached to the peripheral wall portion 27. Therefore, it is possible to suppress a further movement of the melted resin 26 and it is possible to prevent the melted resin 26 from protruding to the outside of the liquid storage bottle 2. In addition, the peripheral wall portion 27 prevents the welding portions (the first annular surface 24b and the second annular surface 25b) of the bottle welding portion 24 and the nozzle welding portion 25 from being exposed to the outside, and thus, it is possible to favorably maintain the appearance of the liquid storage bottle 2. Moreover, the melted resin 26 attached to the peripheral wall portion 27 also contributes to the joining between the bottle welding portion 24 and the nozzle welding portion 25, and thus, joining strength can be increased and seal properties of the liquid storage bottle 2 can be improved.

In order to increase a blocking effect of the melted resin 26 by the peripheral wall portion 27, an inner peripheral surface 27a of the peripheral wall portion 27 can be perpendicular to the centrifugal force, that is, can be parallel to the axial direction X of the nozzle 22. Further, in order to hold an outer shape of the liquid storage bottle 2 smoothly, a concave portion 29 for accommodating the peripheral wall portion 27 can be provided radially outside the first annular surface 24b.

Figure 8A:
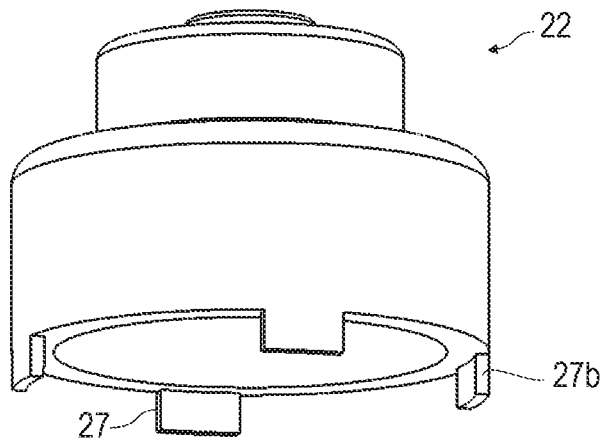
Figure 8B:
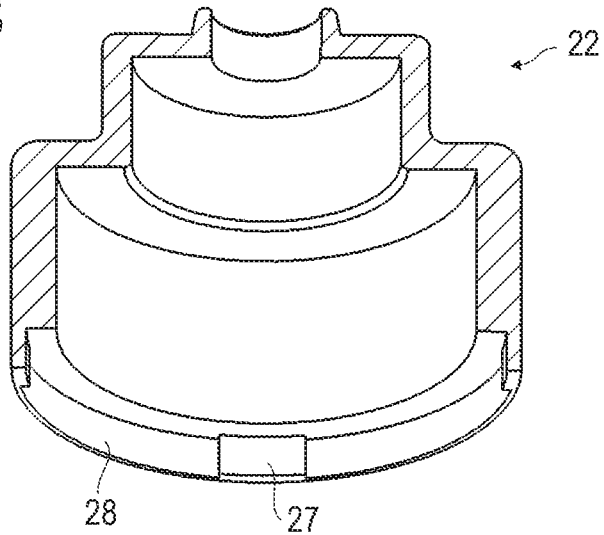
Figure 8C:
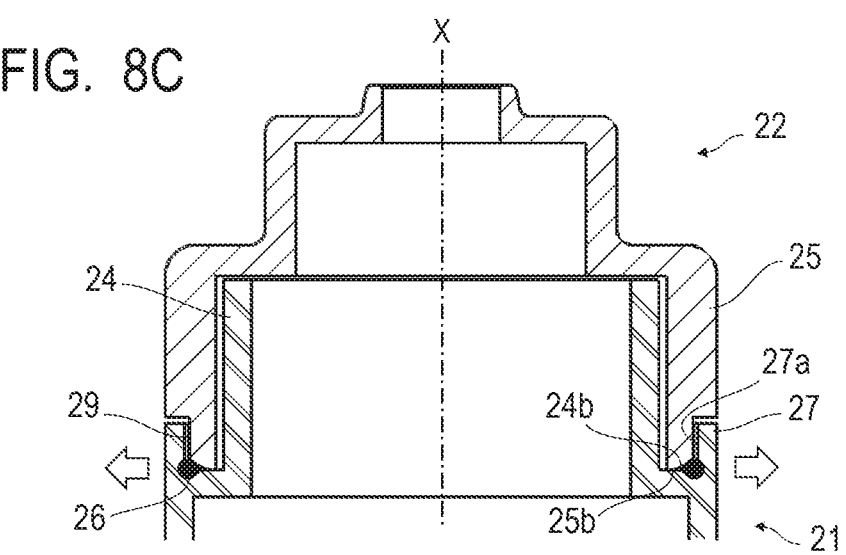

FIG. 8A is a perspective view illustrating a modification example of the nozzle of the present embodiment and FIG. 8B is a perspective view illustrating a cross section of another modification example of the nozzle of the present embodiment. FIG. 8C is a cross-sectional view illustrating still another modification example of the bottle main body and the nozzle of the present embodiment.

The peripheral wall portion 27 does not necessarily need to be formed continuously in a circumferential direction, and a plurality of peripheral wall portions 27 may be formed at intervals in the circumferential direction as illustrated in FIG. 8A. In this case, since a side surface 27b of the peripheral wall portion 27 can collide perpendicularly to a movement direction (a direction of the centrifugal force) of the melted resin 26, the movement direction of the melted resin 26 can be easily changed, and attachment of the melted resin 26 to one of the bottle main body 21 and the nozzle 22 can be promoted. Further, as illustrated in FIG. 8B, a rib 28 connecting the peripheral wall portions 27 to each other may be formed between the peripheral wall portions 27 adjacent to each other. In this case, the melted resin 26 attached to the peripheral wall portion 27 is not exposed to the outside, and thus, the appearance of the liquid storage bottle 2 can be more favorably maintained.

The peripheral wall portion 27 may be provided radially outside one of the first annular surface 24b and the second annular surface 25b and the peripheral wall portion 27 may be provided radially outside the first annular surface 24b as illustrated in FIG. 8C. Even in this case, in order to maintain the outer shape of the liquid storage bottle 2 smoothly, the concave portion 29 for accommodating the peripheral wall portion 27 may be provided radially outside the other of the first annular surface 24b and the second annular surface 25b, that is, the second annular surface 25b.

Second Example Embodiment

Figure 9:
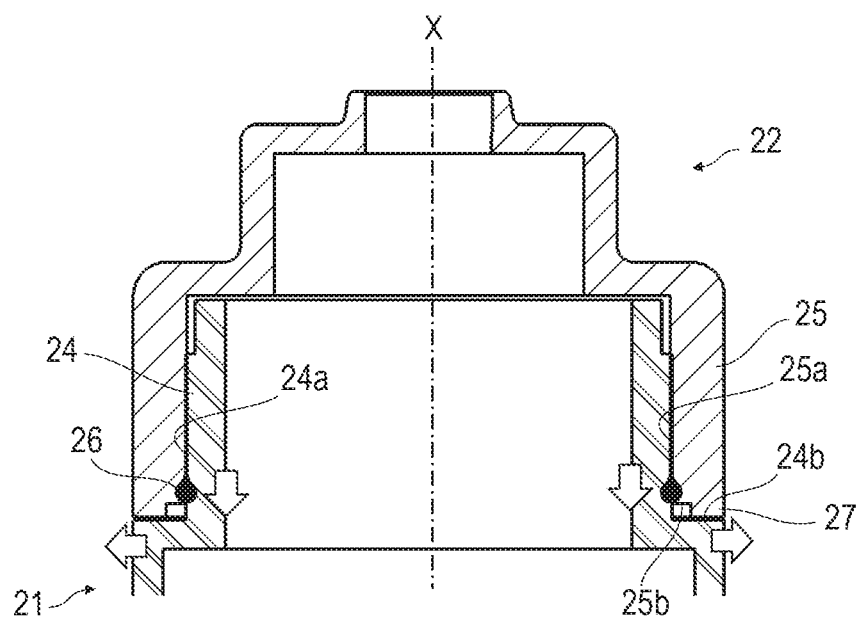

FIG. 9 is a cross-sectional view of a bottle main body and a nozzle according to a second embodiment of the present disclosure. Hereinafter, the same components as those of the first embodiment are denoted by the same reference numerals in the drawings, description thereof will be omitted, and only configurations different from those of the first embodiment will be described.

A welding location between the bottle welding portion 24 and the nozzle welding portion 25 of the present embodiment is different from that of the first embodiment, specifically, the present embodiment is different from the first embodiment in that the outer peripheral surface 24a of the bottle welding portion 24 and the inner peripheral surface 25a of the nozzle welding portion 25 are welded. That is, in the present embodiment, the bottle main body 21 and the nozzle 22 are rotated relative to each other while the outer peripheral surface 24a of the bottle welding portion 24 and the inner peripheral surface 25a of the nozzle welding portion 25 are in contact with each other, and the bottle welding portion 24 is inserted into the nozzle welding portion 25. At this time, frictional heat is generated between the outer peripheral surface 24a of the bottle welding portion 24 and the inner peripheral surface 25a of the nozzle welding portion 25 and the resin is melted by using the frictional heat. Accordingly, the bottle main body 21 and the nozzle 22 are joined to each other by the welding.

In the welding process, the melted resin 26 overflows from a gap (a space between the outer peripheral surface 24a and the inner peripheral surface 25a) between the bottle welding portion 24 and the nozzle welding portion 25, and enters between the first annular surface 24b and the second annular surface 25b. In this case, as in the first embodiment, a radially outward force acts on the melted resin 26 by the centrifugal force generated by the relative rotation between the bottle welding portion 24 and the nozzle welding portion 25. Meanwhile, also in the present embodiment, since the peripheral wall portion 27 is formed radially outside the second annular surface 25b, it is possible to prevent the melted resin 26 from moving further radially outward.

Figure 10A:
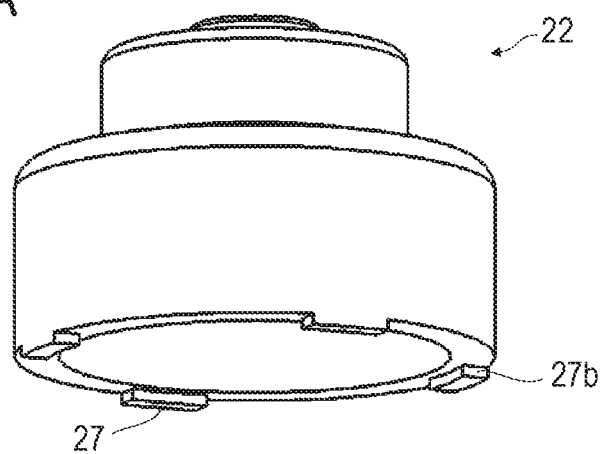
Figure 10B:
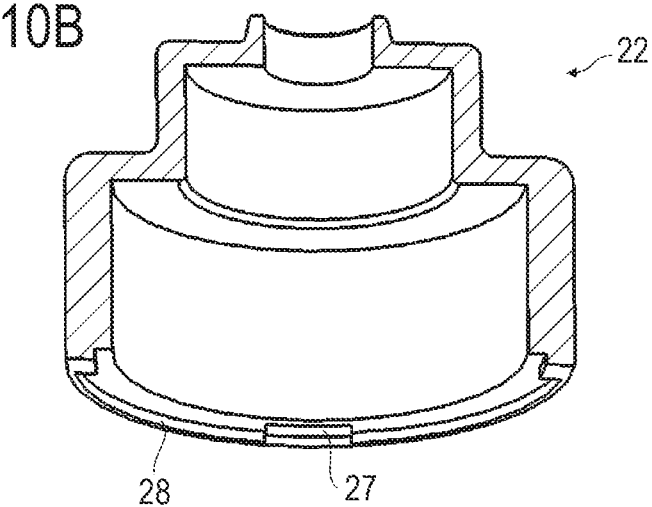
Figure 10C:
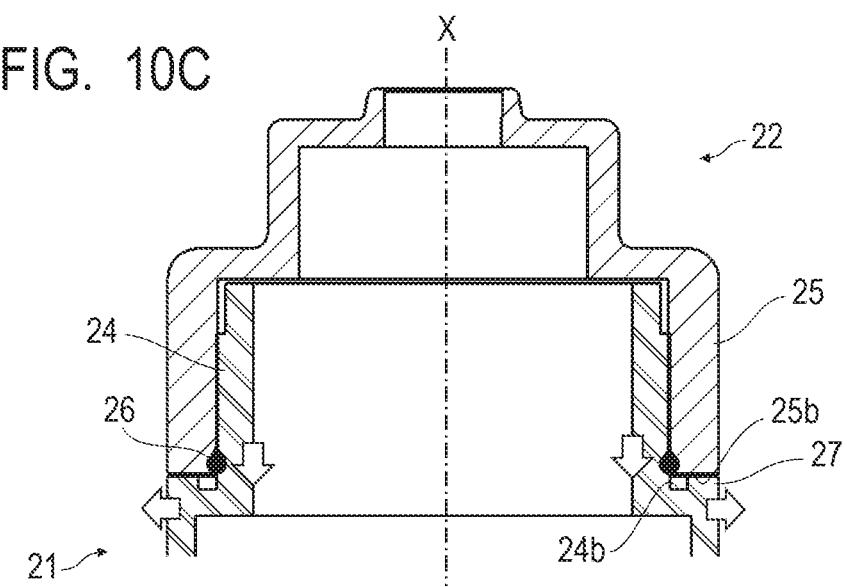

FIG. 10A is a perspective view illustrating a modification example of the nozzle of the present embodiment and FIG. 10B is a perspective view illustrating a cross section of another modification example of the nozzle of the present embodiment. FIG. 10C is a cross-sectional view illustrating still another modification example of the bottle main body and the nozzle of the present embodiment.

In the present embodiment, the plurality of peripheral wall portions 27 may be formed at intervals in the circumferential direction as illustrated in FIG. 10A and the rib 28 connecting the peripheral wall portions 27 to each other may be formed between the peripheral wall portions 27 adjacent to each other as illustrated in FIG. 10B. The peripheral wall portion 27 may be provided radially outside one of the first annular surface 24b and the second annular surface 25b and the peripheral wall portion 27 may be provided radially outside the first annular surface 24b as illustrated in FIG. 10C.

When the bottle welding portion 24 is inserted into the nozzle welding portion 25, the bottle main body 21 may be moved with respect to the nozzle 22, or the nozzle 22 may be moved with respect to the bottle main body 21. However, the nozzle 22 which is easily held by a jig and is easily formed into a highly rigid shape can be moved with respect to the bottle main body 21. In addition, since the melted resin 26 overflows much in front of a movement direction of a member to be moved, the nozzle 22 can be moved with respect to the bottle main body 21 also in that the melted resin 26 can be prevented from falling into the liquid storage bottle 2. Accordingly, when the liquid is replenished from the liquid storage bottle 2 to the liquid tank 12, the melted resin 26 can be prevented from entering the liquid tank 12 as foreign matters.

Third Example Embodiment

Figure 11:
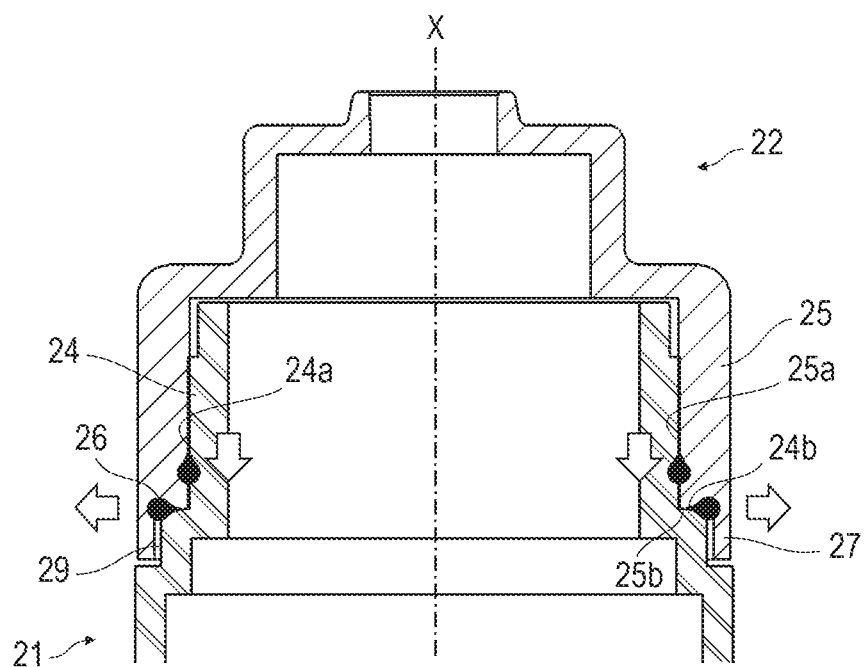

FIG. 11 is a cross-sectional view of a bottle main body and a nozzle according to a third embodiment of the present disclosure. Hereinafter, the same components as those of the above-described embodiments are denoted by the same reference numerals in the drawings, description thereof will be omitted, and only configurations different from those of the above-described embodiments will be described.

The present embodiment is different from the second embodiment in that the concave portion 29 for accommodating the peripheral wall portion 27 is formed radially outside the first annular surface 24b according to the peripheral wall portion 27 formed radially outside the second annular surface 25b. Accordingly, in the present embodiment, in a process in which the outer peripheral surface 24a of the bottle welding portion 24 and the inner peripheral surface 25a of the nozzle welding portion 25 are welded to each other, the first annular surface 24b and the second annular surface 25b come into contact with each other. Therefore, positioning between the bottle main body 21 and the nozzle 22 can be controlled, and thus, a welding state can be stabilized. Further, in the present embodiment, the first annular surface 24b and the second annular surface 25b can be joined to each other by the melted resin 26 attached to the peripheral wall portion 27, and the joining strength between the bottle main body 21 and the nozzle 22 can be improved.

Figure 12A:
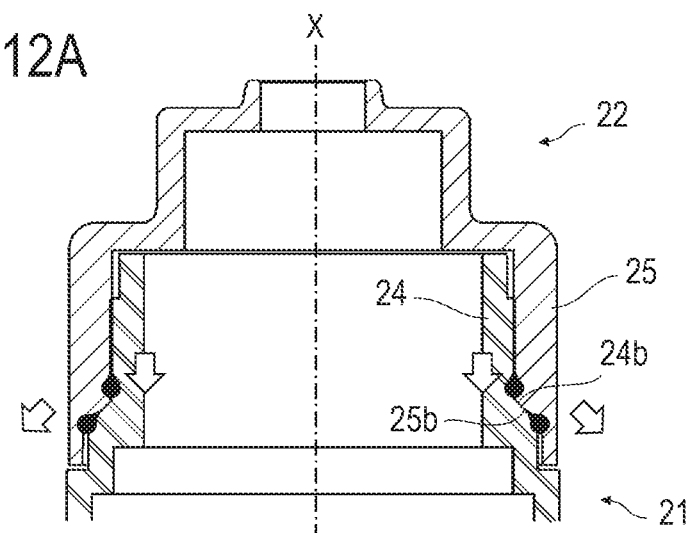
Figure 12B:
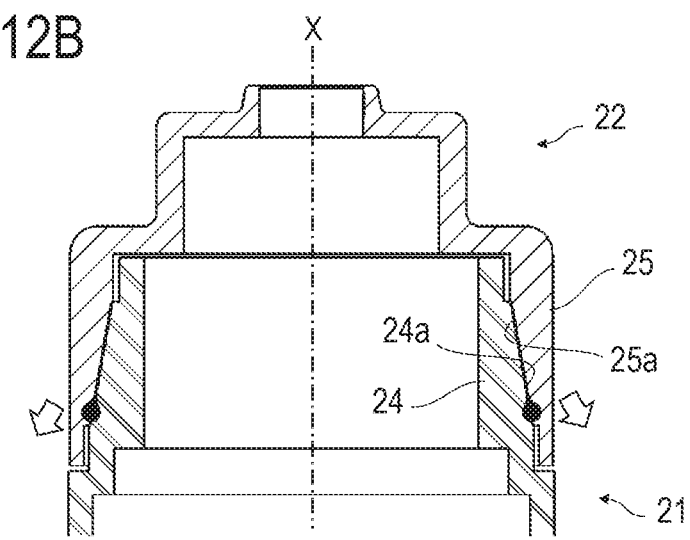
Figure 12C:
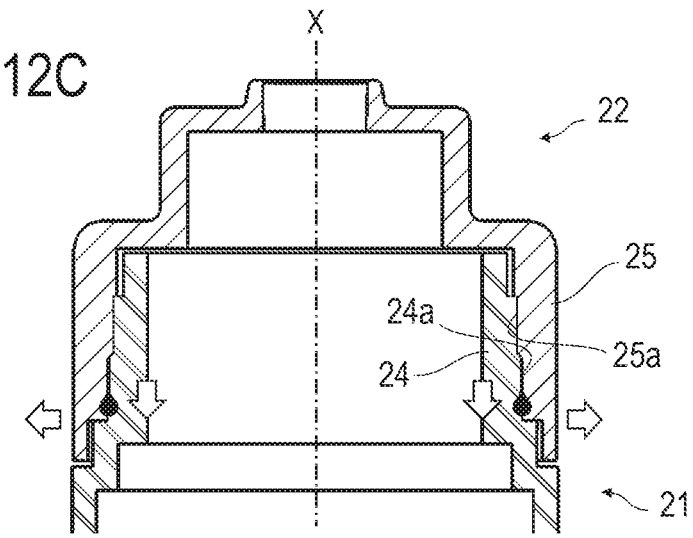

FIGS. 12A to 12C are cross-sectional views illustrating modification examples of the bottle main body and the nozzle of the present embodiment, respectively.

The first annular surface 24b and the second annular surface 25b which come into contact with each other when the bottle welding portion 24 and the nozzle welding portion 25 are welded to each other do not necessarily need to be perpendicular to the axial direction X, and as illustrated in FIG. 12A, the first annular surface 24b and the second annular surface 25b may be inclined with a surface perpendicular to the axial direction X. Moreover, the outer peripheral surface 24a of the bottle welding portion 24 and the inner peripheral surface 25a of the nozzle welding portion 25 which are welded to each other may not be parallel to the axial direction X, may be tapered as illustrated in FIG. 12B, or may be stepped as illustrated in FIG. 12C.

While the present disclosure has been described with reference to example embodiments, it is to be understood that the disclosure is not limited to the disclosed example embodiments. The scope of the following claims is to be accorded the broadest interpretation so as to encompass all such modifications and equivalent structures and functions.

This application claims the benefit of Japanese Patent Application No. 2019-069100, filed Mar. 29, 2019, which is hereby incorporated by reference herein in its entirety.

What is claimed is:

1. A liquid storage bottle comprising:
a bottle main body which has a first cylindrical portion formed of a resin; and
a nozzle which is joined to the bottle main body so as to inject a liquid stored in the bottle main body and has a second cylindrical portion formed of a resin and welded to the first cylindrical portion on an outer peripheral side of the first cylindrical portion,
wherein the first cylindrical portion includes an outer peripheral surface and a first annular surface which extends radially outward from an axial end portion of the outer peripheral surface,
wherein the second cylindrical portion includes an inner peripheral surface which faces the outer peripheral surface of the first cylindrical portion and a second annular surface which extends radially outward from an axial end portion of the inner peripheral surface and faces the first annular surface of the first cylindrical portion, and
wherein a peripheral wall portion which protrudes in an axial direction is formed radially outside one of the first and second annular surfaces, and the peripheral wall portion is formed of a part of the first cylindrical portion or the second cylindrical portion, and
the peripheral wall portion is not in contact with the radially outside one of the first and second annular surfaces that the peripheral wall portion faces.

2. The liquid storage bottle according to claim 1, wherein the peripheral wall portion includes an inner peripheral surface which is parallel to the axial direction.

3. The liquid storage bottle according to claim 1, wherein a plurality of the peripheral wall portions is formed at intervals in a circumferential direction.

4. The liquid storage bottle according to claim 3, wherein a rib which connects the peripheral wall portions to each other is formed between the peripheral wall portions adjacent to each other.

5. The liquid storage bottle according to claim 1, wherein the peripheral wall portion is formed continuously in a circumferential direction.

6. The liquid storage bottle according to claim 1, wherein the first cylindrical portion and the second cylindrical portion are welded to each other on the first annular surface and the second annular surface.

7. The liquid storage bottle according to claim 6, wherein a concave portion for accommodating the peripheral wall portion is formed radially outside the other of the first and second annular surfaces, and
an inner peripheral surface of the peripheral wall portion and the radially outside the other of the first and second annular surfaces are continuous surfaces of the same height.

8. The liquid storage bottle according to claim 1, wherein the first cylindrical portion and the second cylindrical portion are welded to each other on the outer peripheral surface and the inner peripheral surface.

9. The liquid storage bottle according to claim 8, wherein the first annular surface and the second annular surface are joined to each other.

10. The liquid storage bottle according to claim 8, wherein a concave portion for accommodating the peripheral wall portion is formed radially outside the other of the first and second annular surfaces, and
an inner peripheral surface of the peripheral wall portion and radially outside the other of the first and second annular surfaces are continuous surfaces of the same height.

11. The liquid storage bottle according to claim 8, wherein the outer peripheral surface and the inner peripheral surface are formed in a stepped shape.

12. The liquid storage bottle according to claim 8, wherein the outer peripheral surface and the inner peripheral surface are formed in a tapered shape.

13. The liquid storage bottle according to claim 1, wherein each of the first and second annular surfaces is perpendicular to the axial direction.

14. The liquid storage bottle according to claim 1, wherein the peripheral wall portion is formed of the part of the first cylindrical portion.

15. The liquid storage bottle according to claim 1, wherein the peripheral wall portion is formed of the part of the second cylindrical portion.

16. A resin part comprising:
- a first member which has a first cylindrical portion; and
- a second member which is joined to the first member and has a second cylindrical portion welded to the first cylindrical portion on an outer peripheral side of the first cylindrical portion,
- wherein the first cylindrical portion includes an outer peripheral surface and a first annular surface which extends radially outward from an axial end portion of the outer peripheral surface,
- wherein the second cylindrical portion includes an inner peripheral surface which faces the outer peripheral surface of the first cylindrical portion and a second annular surface which extends radially outward from an axial end portion of the inner peripheral surface and faces the first annular surface of the first cylindrical portion, and
- wherein a peripheral wall portion which protrudes in an axial direction is formed radially outside one of the first and second annular surfaces, and the peripheral wall portion is formed of a part of the first cylindrical portion or the second cylindrical portion, and
- the peripheral wall portion is not in contact with the radially outside one of the first and second annular surfaces that the peripheral wall portion faces.

17. The resin part according to claim 16, wherein the peripheral wall portion is formed of the part of the second cylindrical portion.

18. The resin part according to claim 16, wherein the peripheral wall portion is formed of a part of the first cylindrical portion.

* * * * *